(12) United States Patent
Asquith

(10) Patent No.: US 7,508,222 B2
(45) Date of Patent: Mar. 24, 2009

(54) ELECTROMAGNETIC FLOW METER

(75) Inventor: Peter Asquith, Selsley (GB)

(73) Assignee: ABB Limited (GB)

( * ) Notice: Subject to any disclaimer, the term of this patent is extended or adjusted under 35 U.S.C. 154(b) by 0 days.

(21) Appl. No.: 11/623,632

(22) Filed: Jan. 16, 2007

(65) Prior Publication Data

US 2007/0185667 A1 Aug. 9, 2007

(30) Foreign Application Priority Data

Jan. 16, 2006 (GB) .................................. 0600820.5

(51) Int. Cl.
*G01R 27/26* (2006.01)
(52) U.S. Cl. ...................... 324/664; 73/1.34; 73/861.17; 702/65; 702/45; 702/49
(58) Field of Classification Search .................. 324/664; 73/861.11–167, 1.16
See application file for complete search history.

(56) References Cited

U.S. PATENT DOCUMENTS

| | | | | |
|---|---|---|---|---|
| 4,206,641 A | * | 6/1980 | Takada | 73/861.17 |
| 4,520,650 A | * | 6/1985 | Palmer et al. | 73/1.34 |
| 4,676,112 A | * | 6/1987 | Uematsu et al. | 73/861.17 |
| 5,426,984 A | * | 6/1995 | Rovner et al. | 73/861.17 |
| 6,611,775 B1 | * | 8/2003 | Coursolle et al. | 702/65 |
| 6,697,742 B1 | * | 2/2004 | Franklin et al. | 702/45 |
| 2003/0051557 A1 | | 3/2003 | Ishikawa et al. | |
| 2006/0095217 A1 | * | 5/2006 | Coursolle et al. | 702/49 |

FOREIGN PATENT DOCUMENTS

| | | |
|---|---|---|
| GB | 2309308 A | 7/1997 |
| GB | 2333161 A | 7/1999 |
| JP | 10170317 A | 6/1998 |
| WO | WO 95/06857 A1 | 3/1995 |
| WO | WO 98/49528 | 11/1998 |

OTHER PUBLICATIONS

U.K. Search Report, dated Jun. 4, 2007, for U.K. Application No. GB0600820.5 (4 pages) listing 5 cited references.

* cited by examiner

*Primary Examiner*—Timothy J Dole
*Assistant Examiner*—Benjamin M Baldridge
(74) *Attorney, Agent, or Firm*—Husch Blackwell Sanders LLP Welsh & Katz

(57) ABSTRACT

A method of determining the inter-electrode or electrode-to-ground impedance or the filling state of an electromagnetic flow meter having flow sensing electrodes connected to an electrode signal amplifier, the method comprising applying a test input signal to the flow sensing electrodes via a connection through which an output flow measurement signal of the flow meter is transmitted from the amplifier, in a manner such that the output of the amplifier is indicative of the said impedance or the filling state.

23 Claims, 1 Drawing Sheet

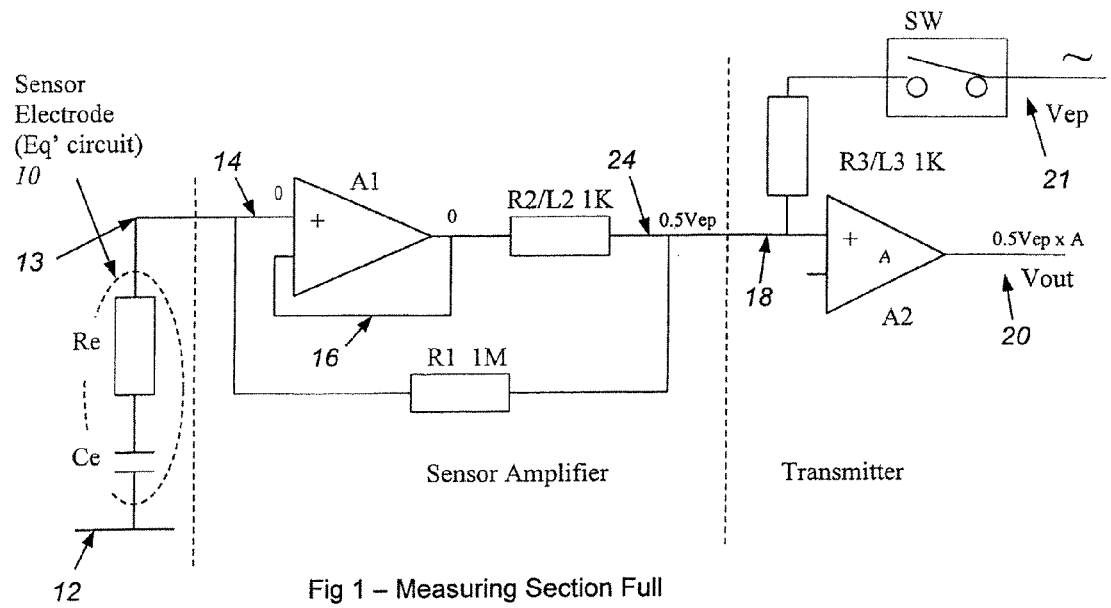
Fig 1 – Measuring Section Full
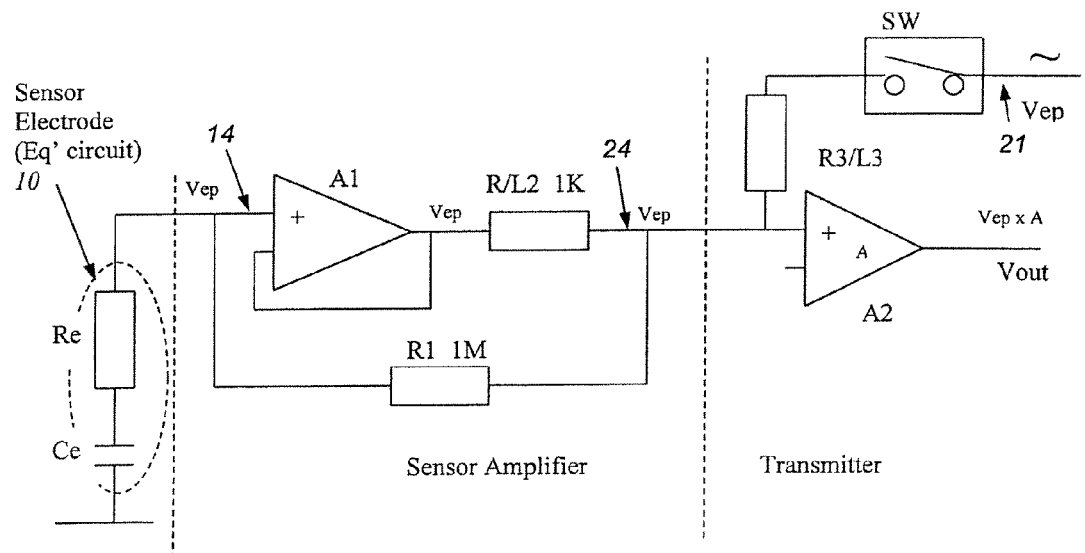
Fig 2 – Measuring Section Empty

ELECTROMAGNETIC FLOW METER

This invention relates to an electromagnetic flow meter, to a method of determining the inter-electrode or electrode-to-ground impedance thereof, and to a method of determining whether the meter is completely full of liquid. Hereafter the term "electrode impedance" is used to mean one or other of the inter-electrode impedance or the electrode to-ground impedance of the meter.

An electromagnetic flow meter can be used for measuring the flow of a conductive liquid. A magnetic field is generated across a measuring section of the meter through which the liquid flows, and by operation of Faraday's law, this generates a voltage orthogonal to both the liquid flow and the magnetic field. This voltage is a function of the liquid flow rate, and is measured by a pair of electrodes on opposite sides of the measuring section. Usually the magnetic field is pulsiform, alternate pulses being of opposite sense, in order to avoid polarisation of the electrodes.

For accurate flow measurement, the measuring section must be at least half-full of liquid. If it is not at least half-full, there may be no continuity, or impaired continuity, through the liquid between the electrodes, leading to a false measurement, or no measurement at all. It thus is necessary to know when the measuring section is not full, so that unreliable flow indications can be disregarded or corrected.

Known solutions to this problem involve sophisticated signal processing and interpretation of the meter output between the output signals derived from successive pulses of the magnetic field. See for example WO98/49528-A, the disclosure of which is incorporated herein by reference.

Electromagnetic flow meters also may be installed such that the output signal from the electrodes is delivered to a remote transmitter. The transmitter may be some distance from the meter itself. In order to prevent or minimise degradation of the electrode output signal during its passage from the meter to the transmitter a pre-amplifier, specifically a buffer amplifier, may be provided at the meter.

The present invention, at least in its preferred embodiments, is directed to a method of interrogating, preferably remotely, an electromagnetic flow meter so as to determine its filling state (i.e. full or not full of conductive liquid) in a simpler manner than hitherto, and which enables the interrogation to be effected despite the presence of an amplifier in the meter's electrode signal output circuit. The invention also is applicable to determination of the electrode impedance of the meter as such; this may enable detection of fouling of the electrodes, as may occur progressively over time if the meter is measuring the flow of a contaminated liquid, for example.

In one aspect the invention provides a method of determining the electrode impedance (as defined) or the filling state of an electromagnetic flow meter having a flow sensing electrode connected to an electrode signal amplifier, the method comprising applying a test input signal to a said electrode via a connection through which an output flow measurement signal of the flow meter is transmitted from the amplifier, in a manner such that the output of the amplifier is indicative of the impedance or the filling state.

Preferably the test input signal is applied to the electrode via a path bypassing the amplifier.

In another aspect the invention provides measuring the electrode impedance (as defined) or the filling state of an electromagnetic flow meter having a flow sensing electrode connected to an electrode signal amplifier, the method comprising applying a test input signal to a said electrode via a connection through which an output flow measurement signal is transmitted from the amplifier, and via a path bypassing the amplifier.

The amplifier may be a buffer amplifier having feedback and substantially unity gain.

The test input signal may be applied from a source remote from the meter.

The test input signal may be applied to the sensor electrode via a relatively high impedance, preferably of the order of 1 $M\Omega$.

Thus the test input signal may be applied to the electrode signal input via an impedance having a high value relative to the electrode impedance of the flow meter when it is full.

Preferably the test input signal is applied to the sensor electrode via a potential divider. Thus the test input signal may be applied to the sensor electrode via a division point of the potential divider, one end of which is connected to the output of the amplifier, the test input signal being applied to the other end thereof.

The potential divider may be resistive or may include one or more reactive (capacitive or inductive) components.

The test input signal may be an AC voltage and may be applied during intervals between energisation of the magnetic field coils of the flow meter.

Alternatively it may be applied simultaneously with energisation of magnetic field coils of the flow meter, and the test output signal subsequently is separated from an output flow measurement signal of the flow meter.

In a further aspect, the invention provides an electromagnetic flow meter comprising a sensing electrode connected to an electrode signal amplifier, and means for implementing a method as set forth above.

The invention also provides a flow measurement system comprising a flow meter as set forth above and a test input signal generator spaced apart from the flow meter and arranged to supply an input test signal thereto via a connection through which in operation a flow measurement signal is transmitted.

The invention will now be described merely by way of example with reference to the accompanying drawings, wherein;

FIG. 1 is a diagrammatic representation of a flow measurement system according to the invention, annotated with signal values representative of a flow meter of the system being full of conductive liquid, and FIG. 2 shows the system of FIG. 1 annotated with signal values representative of the flow meter being empty.

Referring to FIG. 1, an electromagnetic flow meter consists of a conventional measurement section (equivalent circuit shown notionally at 10), a magnetic circuit comprising conventional field coil or coils (not shown) for generating a magnetic field through the measuring section and flow-sensing electrodes 12, 13 represented electrically by the series resistor and capacitor Re, Ce. One electrode 12 is held at a reference voltage, the other 13 is connected at 14 to the positive input of a buffer amplifier Al. The output of the amplifier is taken via a feedback loop 16 to the other input of the amplifier whereby the amplifier has unity gain and the output signal equals the input signal at input 14.

The output signal of amplifier A1 is taken via a 1 $K\Omega$ impedance R2 (which may be resistive or reactive) and a cable 18, which may be of significant length, (perhaps as much as 500 m) to a transmitter 20. There the signal is passed through a further amplifier A2 of gain A for subsequent signal processing and interpretation.

The output end 24 of the impedance R2 is connected via a 1 MΩ impedance R1 (which may be wholly resistive or may also have a reactive component) to the input 14 of amplifier A1, and to the electrode 13.

A test signal generator (not shown) at the remote transmitter 20 provides an alternating test input signal voltage Vep via a line 21 to a normally open to switch SW. During flow measuring operation of the flow meter the field coils produce an alternating pulsiform magnetic field with intervals between the pulses. The magnetic field is alternating rather than unidirectional in order to avoid polarisation of the electrodes 12, 13 and the attendant inaccuracies in flow measurement. During the magnetic field pulses the switch SW is open and no test signal is applied. During the intervals between pulses the switch SW is closed and test input signal Vep is applied via the 1 KΩ impedance R3 over the cable 18. If the measuring section is full of highly conductive liquid such as water then the impedance presented by the resistance Re and capacitance ce across the electrodes 12, 13 is relatively low. For simplicity in this example, Re will be assumed to be 0Ω and Ce to be 1 farad. Then, because electrode 12 is held at reference (Vref, here assumed to be 0v) the potential at electrode 13 and input 14 to the amplifier A1 is 0v as well. Thus, due to its operating characteristic, the output of the amplifier A1 is also 0v, that portion of the excitation signal Vep at point 24 being reduced to zero at input 14 due to the large resistance R1.

The input test voltage Vep is absorbed substantially equally across the potential divider constituted by the two impedances R2, R3, the current flowing through R2 being absorbed in the drive current of the amplifier A1. Negligible current flows through R1. The voltage at the division point 24 of the potential divider thus is 0.5 Vep, and this voltage is inputted to amplifier A2 as indicative of the fact that the output of amplifier A1 is 0v, signifying that the measuring section of the meter is full of liquid.

Considering now FIG. 2, in which the measuring section is empty, Re is assumed to be 100 GΩ (effectively infinite) because there is no continuity between the electrodes and Ce is assumed to be zero. Because Re>>R1 and Ce is negligible, no current flows through R1 where the test input signal is applied via switch SW and there is no voltage drop across it. Likewise there is no current flow through R2 or R3, and no voltage drop across them. The feedback path through R1 connects Vep at point 24 to the input 14 of the amplifier A1 which bootstraps its input also to Vep. Thus the voltage at point 24 is stabilised at Vep, and is applied as input to amplifier A2. The output of this amplifier is Vep×A, where A is the gain of amplifier A2, and is indicative of the fact that the output of amplifier A1 is Vep, signifying that the measuring section is empty of fluid.

Whilst the above examples are idealised in that Re will not be zero even with a full measuring section, Re nevertheless will be very low compared to R1 and thus the voltage at input 14 to amplifier A1 will be much less than Vep. Thus whilst the output of amplifier A1 will not be zero, it also will be identically low, and the voltage at point 24, whilst more than 0.5 Vep will still be substantially less than Vep, and thus distinguishable from the "empty" case.

Because the output of amplifier A1, and the voltage at point 24 are quantitatively related to the value of Re, the method serves also to provide an indication that the measuring section is only partly full, as would be the case with turbulent flow across the whole of the measuring section but containing transient voids. Likewise the method can be used to determine inter-electrode impedance when the pipe is full, yielding information on the degree of fouling of the electrodes.

Although the method has been described in an embodiment in which the test signal is applied in the intervals between the taking of flow measurements using a pulsed magnetic field, in principle there is no reason why the test signal should not be applied whilst flow measurement is taking place. Signal processing would of course be necessary to separate the resultant filling state or electrode resistance signal from the flow measurement signal, using demodulation of different orthogonal excitation frequencies.

In another form of the invention, instead of the inter-electrode impedance being measured, there is measured the impedance between one of the electrodes 12, 13 and ground. For example, a suitable additional grounded electrode is provided in the wall of the measuring section, and the impedance between it and electrode 13 is measured as described above, with Vref=ground. Alternatively if electrode 12 is selectively grounded when the test signal is applied, the third electrode is not necessary, but additional circuitry would be necessary to switch electrode 12 to ground in response to the test signal. Alternatively a suitable grounded electrode may be provided by conduction through the metal flow conduit or the flow sensor grounding rings.

The feedback is shown as taken immediately from the output of the amplifier A1. There could however be a resistor or other impedance between the amplifier output and the point from which feedback is taken. Because an impedance would be within the feedback loop, the output impedance of the amplifier and its feedback loop taken together still would be very low, and the foregoing analysis still would be valid.

Each feature disclosed in this specification (which term includes the claims) and/or shown in the drawings may be incorporated in the invention independently of other disclosed and/or illustrated features.

The text of the abstract filed herewith is hereby deemed to be repeated here in full as part of the specification.

A method of determining the inter-electrode or electrode-to-ground impedance or the filling state of an electromagnetic flow meter having flow sensing electrodes connected to an electrode signal amplifier, the method comprising applying a test input signal to a said flow electrode via a connection through which an output flow measurement signal of the flow meter is transmitted from the amplifier, in a manner such that the output of the amplifier is indicative of the said impedance or the filling state.

The invention claimed is:

1. A method of determining the electrode impedance or the filling state of an electromagnetic flow meter having flow sensing electrodes connected to an electrode signal amplifier which generates an output flow measurement signal indicative of a potential difference between said flow sensing electrodes, the method comprising applying a test input signal to a flow sensing electrode via a connection through which said output flow measurement signal of the flow meter is transmitted from the amplifier, and determining the electrode impedance or the filling state of the electromagnetic flow meter using an output from the amplifier obtained when said test signal is applied to said flow sensing electrode.

2. A method as claimed in claim 1 wherein the test input signal is applied to the flow sensing electrode via a path bypassing the amplifier.

3. A method as claimed in claim 1 wherein the amplifier is a buffer amplifier having feedback and substantially unity gain.

4. A method as claimed in claim 1 wherein the test input signal is applied from a source remote from the meter.

5. A method as claimed in claim 1 wherein the test input signal is applied to the sensor electrode via a relatively high impedance.

6. A method as claimed in claim 1 wherein the test input signal is applied to the electrode signal input via an impedance having a high value relative to the electrode impedance of the flow meter when it is full.

7. A method as claimed in claim 1 wherein the test input signal is applied to the sensor electrode via a potential divider.

8. A method as claimed in claim 7 wherein the test input signal is applied to the sensor electrode via a division point of the potential divider, one end of which is connected to the output of the amplifier, the test input signal being applied to the other end thereof.

9. A method as claimed in claim 1 wherein the test input signal is an AC signal.

10. A method as claimed in claim 1 wherein the test input signal is applied during intervals between energisation of a magnetic circuit of the flow meter.

11. A method as claimed in claim 1 wherein the test input signal is applied simultaneously with energisation of a magnetic circuit of the flow meter, and the test output signal subsequently is separated from an output flow measurement signal of the flow meter.

12. An electromagnetic flow meter comprising flow sensing electrodes, an electrode signal amplifier connected to the flow sensing electrodes for generating an output flow measurement signal indicative of a potential difference between said flow sensing electrodes, and a test circuit for applying a test input signal to a flow sensing electrode via a connection through which said output flow measurement signal is transmitted from the amplifier.

13. A meter as claimed in claim 12 comprising a path bypassing the amplifier for applying the test input signal to the flow sensing electrode.

14. A meter as claimed in claim 12 wherein the amplifier is a buffer amplifier having feedback and substantially unity gain.

15. A meter as claimed in claim 12 comprising a source remote from the meter for applying the test input signal.

16. A meter as claimed in claim 12 comprising a relatively high impedance via which the test input signal is applied to the sensor electrode.

17. A meter as claimed in claim 12 comprising an impedance having a high value relative to the electrode impedance of the flow meter when it is full via which the test input signal is applied to the electrode signal input.

18. A meter as claimed in claim 12 comprising a potential divider via which the test input signal is applied to the sensor electrode.

19. A meter as claimed in claim 18 wherein the test input signal is applied to the sensor electrode via a division point of the potential divider, one end of which is connected to the output of the amplifier, the test input signal being applied, in use, to the other end of the potential divider.

20. A meter as claimed in claim 12 comprising an AC signal source for the test input signal.

21. A meter as claimed in claim 12 wherein the test circuit is arranged to apply the test input signal during intervals between energisation of magnetic field coils of the flow meter.

22. A meter as claimed in claim 12 wherein the test input circuit is arranged to apply the test input signal simultaneously with energisation of magnetic circuit of the flow meter, and comprising a signal processor for subsequently separating the test output signal from the output flow measurement signal of the flow meter.

23. A flow measurement system comprising a flow meter as claimed in claim 12, and a test signal generator arranged to supply an input test signal to the test circuit.

* * * * *